United States Patent
Patterson et al.

(10) Patent No.: US 9,556,897 B2
(45) Date of Patent: Jan. 31, 2017

(54) DRIVEN SHAFT WITH ROTATIONAL KINETIC ENERGY DISSIPATION FOR AN AGRICULTURAL HARVESTER

(71) Applicant: CNH Industrial America LLC, New Holland, PA (US)

(72) Inventors: Chase Patterson, Camp Hill, PA (US); Kevin Ward, Lititz, PA (US); Logan M. Hanson, Thief River Falls, MN (US); Wayne T. Flickinger, Oxford, PA (US); Andrew Birkel, Downingtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/700,971

(22) Filed: Apr. 30, 2015

(65) Prior Publication Data

US 2016/0319857 A1    Nov. 3, 2016

(51) Int. Cl.
*B65F 1/00* (2006.01)
*F16C 3/02* (2006.01)
*A01F 12/46* (2006.01)
*F16D 1/06* (2006.01)

(52) U.S. Cl.
CPC ............... *F16C 3/02* (2013.01); *A01F 12/46* (2013.01); *F16D 1/06* (2013.01)

(58) Field of Classification Search
CPC ....... B65G 33/32; B65G 33/265; B65G 33/12; B65G 33/14; B65G 33/26; B65G 2812/0527; A01D 41/1217; A01F 12/46
USPC .......................................... 414/526; 460/114
See application file for complete search history.

(56) References Cited

U.S. PATENT DOCUMENTS

| | | | | |
|---|---|---|---|---|
| 796,477 A | * | 8/1905 | Wallace | A61J 3/002 141/236 |
| 2,270,471 A | * | 1/1942 | Pilcher | A01D 61/008 198/672 |
| 2,892,327 A | * | 6/1959 | Kressin | F16D 3/74 464/157 |
| 3,670,913 A | * | 6/1972 | Reaves | A01F 12/46 414/505 |
| 3,705,644 A | * | 12/1972 | Kawchitch | B65G 33/00 198/664 |
| 4,037,745 A | * | 7/1977 | Hengen | B60P 1/40 198/668 |

(Continued)

FOREIGN PATENT DOCUMENTS

GB          345566          3/1931

*Primary Examiner* — Árpád Fábián-Kovács
(74) *Attorney, Agent, or Firm* — Patrick Sheldrake; Peter Zacharias

(57) ABSTRACT

An agricultural harvester includes an unloading auger carried by a chassis and supplied with cleaned crop material that has passed through a cleaning system. The unloading auger includes a drive auger assembly having a drive coupling and a driven auger assembly. The driven auger assembly includes a hollow tube having an inner surface; an inner rod journaled within the hollow tube and defining a first end and a second end; a coupler attached to the first end of the inner rod that is configured to couple to the drive coupling; and a tube connector rotatably coupling the inner rod to the inner surface of the hollow tube adjacent to the second end of the inner rod. The inner rod is only rotatably coupled to the hollow tube adjacent to the second end of the inner rod.

15 Claims, 4 Drawing Sheets

(56) References Cited

U.S. PATENT DOCUMENTS

| | | | | |
|---|---|---|---|---|
| 4,572,356 | A | * | 2/1986 | Janick .................. B65G 33/32 198/573 |
| 4,852,719 | A | * | 8/1989 | Lapeyre ............... B65G 33/265 198/658 |
| 5,013,208 | A | * | 5/1991 | Grieshop ................ B60P 1/40 414/519 |
| 5,099,985 | A | * | 3/1992 | Lapeyre ............... B65G 33/265 198/658 |
| 5,100,281 | A | * | 3/1992 | Grieshop ................ B60P 1/40 414/519 |
| 5,687,832 | A | * | 11/1997 | Thiessen ............. B65G 33/265 198/676 |
| 6,042,326 | A | * | 3/2000 | Thomas .................. B60P 1/42 198/674 |
| 6,533,105 | B1 | | 3/2003 | Dutschke |
| 6,681,871 | B2 | * | 1/2004 | Drumm .................. E21B 10/44 175/19 |
| 6,767,174 | B2 | * | 7/2004 | Cresswell ............... B60P 1/42 198/668 |
| 7,367,881 | B2 | | 5/2008 | Voss et al. |
| 7,381,131 | B1 | * | 6/2008 | Harpole ................. A01F 12/46 198/671 |
| 7,516,838 | B2 | | 4/2009 | Dutschke |
| 7,641,001 | B2 | * | 1/2010 | Mash .................... E21B 10/44 175/323 |
| 7,946,355 | B1 | * | 5/2011 | Kluge ................... A01K 97/01 175/18 |
| 9,156,624 | B2 | | 10/2015 | Farley et al. |
| 2001/0026755 | A1 | * | 10/2001 | Wood ..................... B60P 1/42 414/523 |
| 2007/0102260 | A1 | * | 5/2007 | Reimer ............. A01D 41/1217 198/313 |
| 2007/0172338 | A1 | * | 7/2007 | Reimer ............... A01D 43/073 414/339 |
| 2013/0126309 | A1 | * | 5/2013 | Osmani ............... B65G 33/265 198/676 |
| 2014/0066149 | A1 | | 3/2014 | Dise et al. |
| 2015/0107965 | A1 | * | 4/2015 | Price ...................... E02D 5/56 198/657 |
| 2015/0296709 | A1 | | 10/2015 | Patterson et al. |

* cited by examiner

DRIVEN SHAFT WITH ROTATIONAL KINETIC ENERGY DISSIPATION FOR AN AGRICULTURAL HARVESTER

BACKGROUND OF THE INVENTION

1. Field of the Invention

The present invention relates to agricultural harvesters, and, more particularly, to driven shafts for agricultural harvesters.

2. Description of the Related Art

An agricultural harvester known as a "combine" is historically termed as such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typical unloading systems for combines involve unloading augers that are formed from inner and outer tubes (relative to the chassis of the combine) with rotatable augers inside that can be actuated to move grain longitudinally through the tubes. The tubes are pivoted to the combine so that they may be displaced laterally relative to the movement of the combine to an unload position in which grain is deposited in a wagon or other vehicle for transport. When the unloading function is completed, the auger tubes are retracted to a fold position in which the inner auger tube is generally parallel to the longitudinal axis of the combine and the outer auger tube is bent to an angle in a horizontal plane so that its free end is maintained within the overall configuration of the combine.

The auger tubes each have longitudinally extending augers within them that are mounted for rotation so that crop material is moved longitudinally through the augers. Because the auger tubes are pivoted between the unload and fold position, it is necessary to provide a mechanical coupling between the drive auger in the inner auger tube and the driven auger in the outer auger tube that delivers crop material to a transport vehicle. The coupling can be a first coupler, such as a cog, on the end of the auger shaft of the drive auger that has a complementary shape to a second coupler, which can also be a cog, on the auger shaft of the driven auger, so that the first cog abuts against the second cog during rotation of the drive auger to drive the driven auger.

When the drive auger and driven auger are pivoted apart then back together, the cogs can become separated from one another such that the first cog of the drive auger must be rotated nearly a full 360 degrees before abutting against the second cog of the driven auger. This rotation produces maximum potential rotational speed prior to abutment of the cogs and maximizes kinetic energy transfer over a short duration of time. This relative velocity of the two mating cogs upon impact creates a large impact force, which is then transmitted upstream through the drive system and can cause accelerated wear of drive and driven auger components.

What is needed in the art is an unloading auger with reduced rotational impact energy between the drive and driven couplers.

SUMMARY OF THE INVENTION

The present invention provides a driven shaft assembly including a hollow tube with an inner rod held within the hollow tube that acts as a dampener for rotational impact energy.

The invention in one form is directed to an agricultural harvester including a chassis; a cleaning system carried by the chassis configured to clean crop material; a crop material elevator carried by the chassis and supplied with cleaned crop material from the cleaning system; and an unloading auger carried by the chassis and supplied with cleaned crop material that has passed through the crop material elevator. The unloading auger includes a drive auger assembly having a drive coupling and a driven auger assembly. The driven auger assembly includes a hollow tube having an inner surface; an inner rod journaled within the hollow tube and defining a first end and a second end; a coupler attached to the first end of the inner rod that is configured to couple to the drive coupling; and a tube connector rotatably coupling the inner rod to the inner surface of the hollow tube adjacent to the second end of the inner rod. The inner rod is only rotatably coupled to the hollow tube adjacent to the second end of the inner rod.

The invention in another form is directed to a driven shaft assembly including a hollow tube having an inner surface; an inner rod journaled within the hollow tube and defining a first end and a second end; a coupler attached to the first end of the inner rod that is configured to couple the inner rod to a rotating element; and a tube connector rotatably coupling the inner rod to the inner surface of the hollow tube adjacent to the second end of the inner rod. The inner rod is only rotatably coupled to the hollow tube adjacent to the second end of the inner rod.

The invention in yet another form is directed to a driven shaft assembly for an agricultural harvester including a hollow tube having an inner surface and defining a tube length; an inner rod held in the hollow tube and defining a first end, the inner rod and the hollow tube defining an overlap length therebetween with an overlap end that is distanced at least 50% of the tube length away from the first end of the inner rod; a coupler attached to the first end of the inner rod and configured to couple the inner rod to a rotating element; and a tube connector rotatably coupling the inner rod to the inner surface of the hollow tube adjacent to the overlap end. The inner rod is only rotatably coupled to the hollow tube adjacent to the overlap end.

An advantage of the present invention is the inner rod can dampen the rotational impact energy transmitted to the driven auger assembly and increase the longevity of the driven auger assembly.

Another advantage is that the driven auger assembly can be easily retrofitted to combine harvesters.

Yet another advantage is the driven auger assembly does not require specific management of the drive and driven auger speeds to reduce the rotational impact energy.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
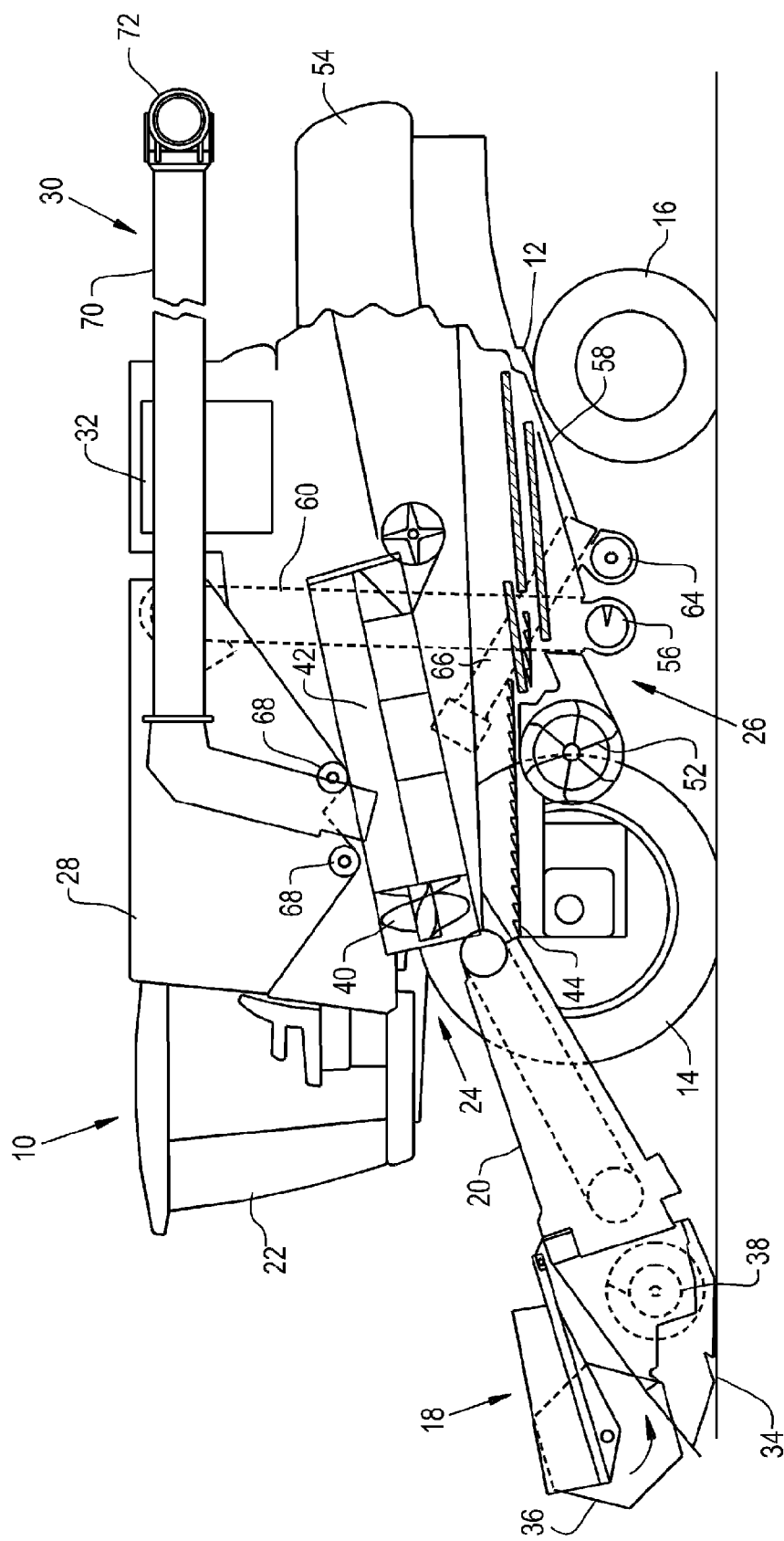
FIG. 1 is a perspective view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. While the rotatable reel 36 is shown as feeding crop material into the header 18, it should be appreciated that the rotatable reel 36 is optional. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
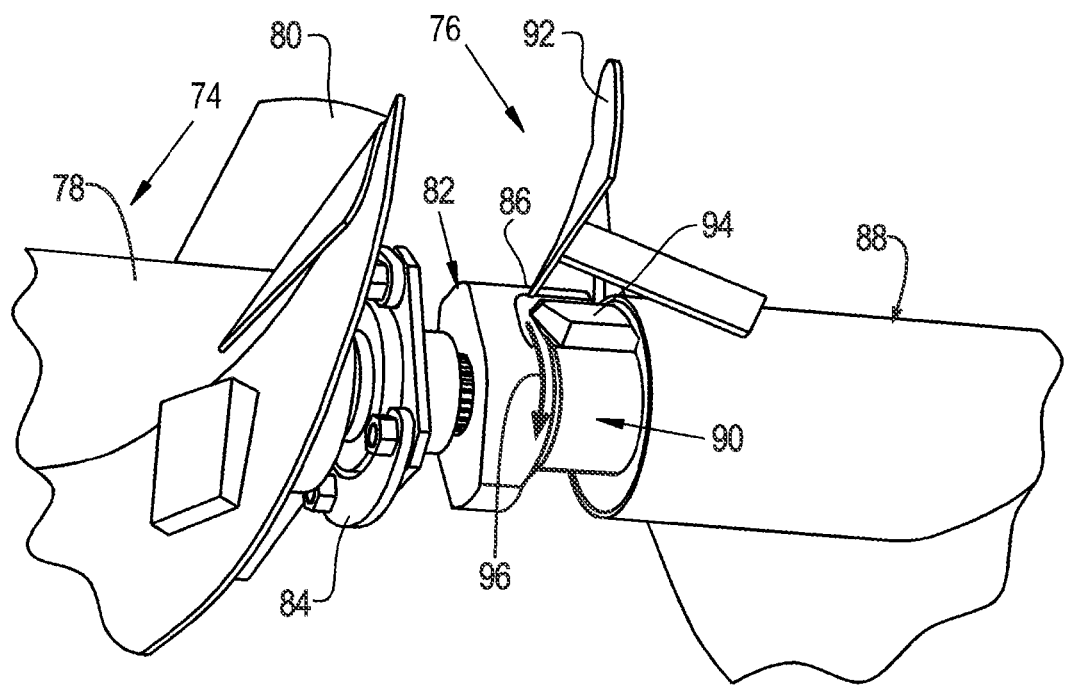
FIG. 2 is a perspective view of an embodiment of an unloading auger of the agricultural harvester shown in FIG. 1 with a drive auger assembly and driven auger assembly coupled together.
Figure 3:
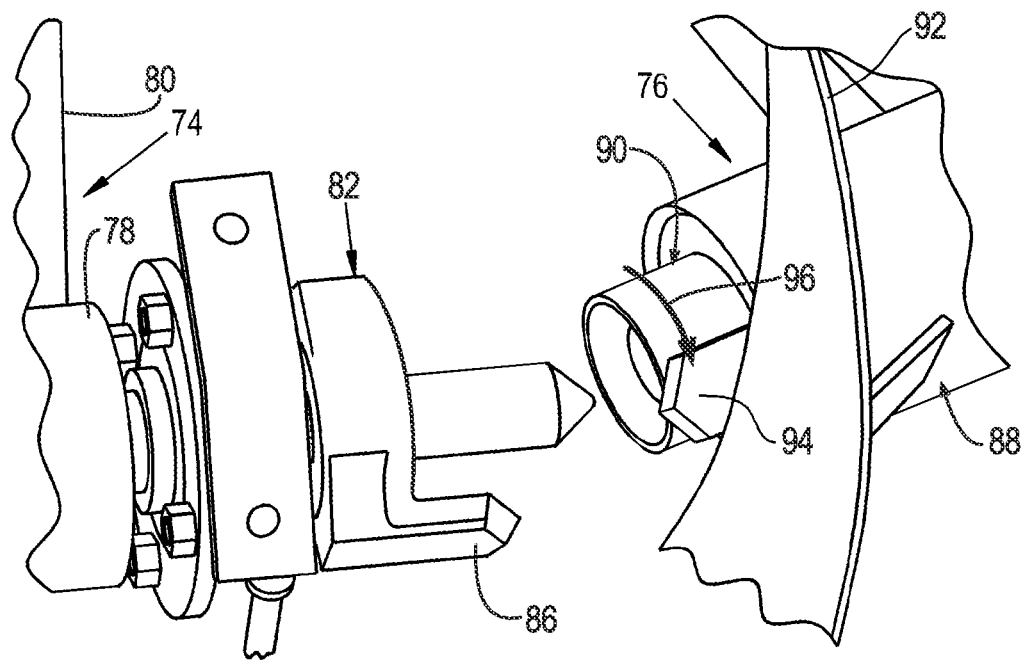
FIG. 3 is a perspective view of the unloading auger shown in FIG. 2 with the drive auger assembly and driven auger assembly uncoupled from one another.

Referring to FIGS. 1, 2, and 3, unloading auger assembly 30 is formed from a first (or inner) auger tube 70 pivotally connected to combine 10 to receive grain from grain tank 28. Auger tube 70 has a longitudinally extending auger 74, which is a drive auger assembly. A second (or outer) auger tube 72 has an auger 76, which is a driven auger assembly, both shown in FIG. 2 to convey crop material along the axis of tubes 70 and 72. Auger tube 70 is pivotally connected to second auger tube 72 by an appropriate pivotal interconnection (not shown). The arrangement of first and second auger tubes 70 and 72 in FIG. 1 shows the auger assembly 30 in a position in between the load position and the fold position in which first auger tube 70 extends alongside the combine 10 and second auger tube 72 is folded to be maintained within the width of the combine 10. As shown in FIG. 1, the angle made between the first and second auger tubes 70 and 72 is 95°, but other angles may be employed.

The auger tubes 70, 72 are in the fold position, except when crop material is being discharged, in which case the auger tubes 70 and 72 are pivoted to be coaxial in the load position for discharging grain and the auger assembly is pivoted to a position generally laterally from the combine 10.

Referring now specifically to FIG. 2, it can be seen that the drive auger 74 and driven auger 76 can be coupled together to form a continuous unloading auger assembly 30. As can be seen, the drive auger assembly 74 can include a drive shaft 78 which carries a flighting 80 and has a driving coupling 82 attached to a distal end 84 of the drive shaft 78. The driving coupling 82 is shown as a drive cog with a single tooth 86, but the driving coupling 82 can be formed as any type of coupling configuration. The driven auger assembly 76 can include a driven shaft assembly 88, which will be further described herein, that includes a coupler 90 which is complementary to the drive cog 82 of the drive auger assembly 74 and a flighting 92 carried by the driven shaft assembly 88. Similar to the drive cog 82 of the drive auger assembly 74, the coupler 90 of the driven auger assembly 76 is shown as being formed as a driven cog with a single tooth 94, but the coupler 90 can be formed as any type of coupler configuration that is complementary to the driving coupling 82 so that the driven auger assembly 76 can be driven by the drive auger assembly 74. As the drive auger assembly 74 rotates in a direction of rotation, signified by arrow 96, the driving coupling 82 abuts against the coupler 90, as shown, so that rotational force can be transmitted from the drive auger assembly 74 to the driven auger assembly 76 and rotate the driven auger assembly 76.

Referring now specifically to FIG. 3, the drive auger assembly 74 is shown uncoupled from the driven auger assembly 76. As can be seen, the tooth 86 of the drive cog 82 is positioned on an opposite side of the tooth 94 of the driven cog 90 in the direction of rotation 96, so a near full rotation of the drive shaft 78 is necessary to abut the tooth 86 of the drive cog 82 against the tooth 94 of the driven cog 90 and rotate the driven auger assembly 76. This rotation of the drive shaft 78 creates significant rotational impact energy between the drive cog 82 and driven cog 90 that can adversely affect the drive auger assembly 74 and driven auger assembly 76 if not suitably dissipated.

Figure 4:
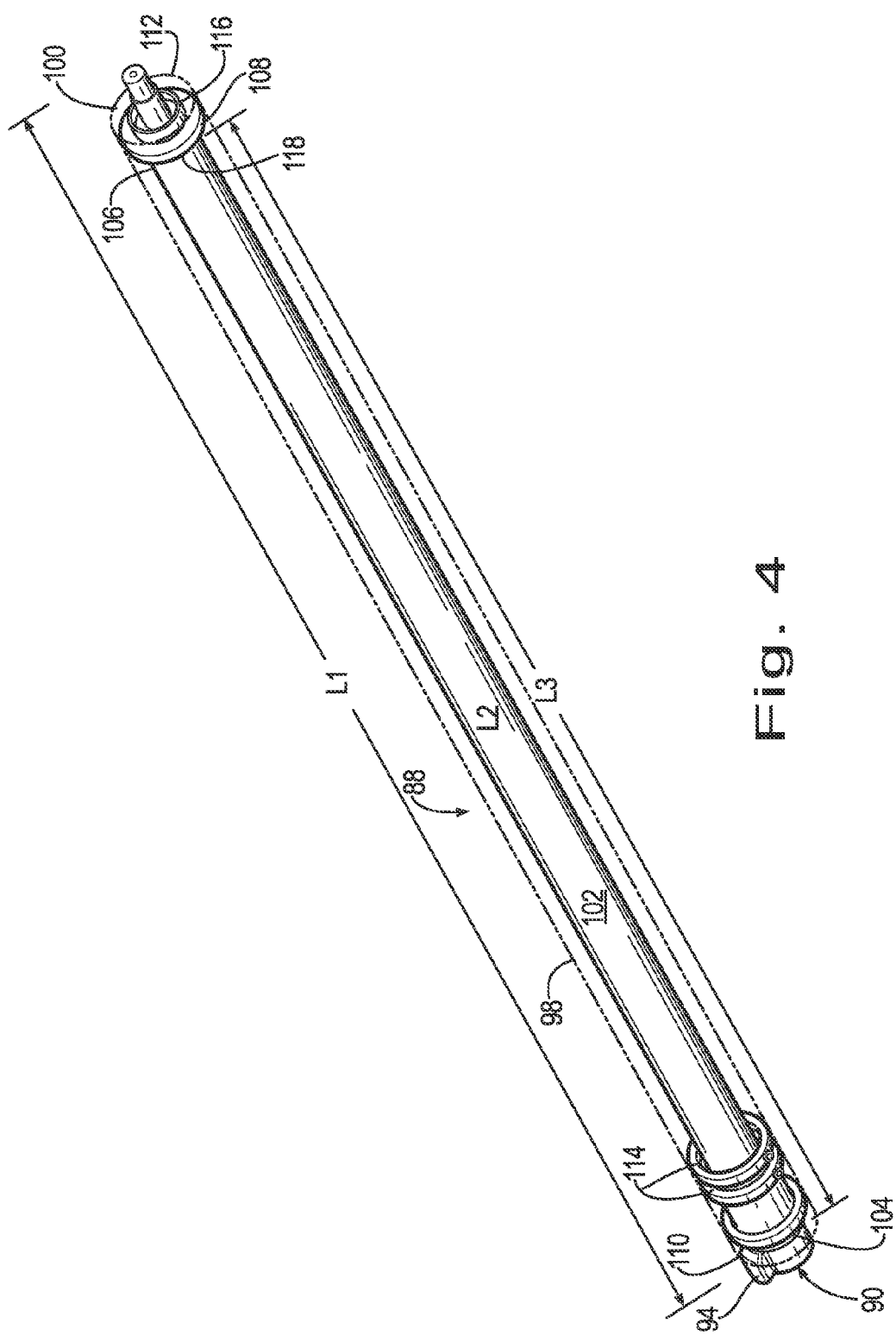
FIG. 4 is a perspective view of an embodiment of a driven shaft assembly according to the present invention.

Referring now to FIG. 4, an embodiment of a driven shaft assembly 88 of the driven auger assembly 76 according to the present invention is shown. The driven shaft assembly 88 generally includes a hollow tube 98 with an inner surface 100, an inner rod 102 held within the hollow tube 98 with a first end 104 attached to the coupler 90 and a second end 106 opposite the first end 104, and a tube connector 108 rotatably coupling the inner rod 102 to the inner surface 100 of the hollow tube 98. The hollow tube 98 is drawn in broken lines for ease of illustrating the components held within the hollow tube 98, but it should be appreciated that the hollow tube 98 can have a generally solid outer surface. The hollow tube 98 can be formed of a variety of materials commonly used to form auger shafts, such as metals or polymers. As can be seen, the hollow tube has a tube length L1 extending from a first longitudinal end 110 of the hollow tube 98 to a second longitudinal end 112 of the hollow tube 98, the significance of which will be further described herein.

The inner rod 102, as shown, is held within the hollow tube 98. The inner rod 102 can be formed as a solid rod of material, such as a metal or polymer, or a rod that is substantially solid, i.e., at least 90% of the volume occupied by the inner rod 102 is occupied by material forming the inner rod 102. Although shown as being a cylindrical rod, the inner rod 102 can be formed in other shapes so long as the inner rod 102 is allowed to be rotated within the hollow tube 98 by the coupler 90. The inner rod 102 defines a rod length L2 between the first end 104 and second end 106, which can be adjusted as desired. The inner rod 102 can be journaled within the hollow tube 98 by bearings 114 held between the inner rod 102 and the inner surface 100 of the hollow tube 98, but bearings 114 are optional and it is contemplated that the inner rod 102 can be held within the hollow tube 98 without any contact between the inner rod 102 and the inner surface 100 of the hollow tube 98 other than by the coupling provided by the tube connector 108. When bearings 114 or other elements are used to journal the inner rod 102 within the hollow tube 98, the bearings 114 can steady the inner rod 102 within the hollow tube 98 while allowing for relative rotation between the inner rod 102 and hollow tube 98 prior to the driving coupling 82 fully engaging the coupler 90, which will be described further herein. A hanger bearing 116 can also be connected to the inner rod 102 near the second end 106. As can be seen, the inner rod 102 and hollow tube 98 define an overlap length L3 therebetween in which the inner rod 102 is at least partially surrounded by the hollow tube 98. The overlap length L3 is defined between an overlap end 118, where the overlap between the inner rod 102 and hollow tube 98 ends, and the first end 104 of the inner rod 102. In this sense, the overlap end 118 is distanced from the first end 104 of the inner rod 102 by a distance equal to the overlap length L3. As shown in FIG. 4, the overlap length L3 is equal to the rod length L2, since the inner rod 102 is entirely journaled within the hollow tube 98, which is shown as being approximately 95% of the entire tube length L1. It is contemplated that the overlap length L3 defined between the inner rod 102 and hollow tube 98 could be significantly less, such as 50% of the tube length L1. Further, the overlap end 118 is shown in FIG. 4 as being the second end 106 of the inner rod 102, but it is contemplated that the overlap end 118 could be at a point other than the second end 106 of the inner rod 102.

The tube connector 108 rotatably couples the inner rod 102 to the inner surface 100 of the hollow tube 98 so that rotation of the inner rod 102 by the coupling of the coupler 90 to the driving coupling 82 also causes rotation of the hollow tube 98. As shown, the tube connector 108 is formed as a solid disk surrounding the inner rod 102 and connected to the inner surface 100 of the hollow tube 98, but the tube connector 108 can be configured in any manner that rotatably couples the inner rod 102 to the inner surface 100 of the hollow tube 98. The inner rod 102 is only rotatably coupled to the inner surface 100 of the hollow tube 98 by the tube connector 108, so that the only part of the inner surface 100 of the hollow tube 98 that is fixedly connected to the inner rod 102 is the part that is connected to the tube connector 108. While the bearings 114, if included, can provide contact between the inner rod 102 and the inner surface 100 of the hollow tube 98, the bearings 114 do not provide a fixed attachment between the inner rod 102 and the inner surface 100 of the hollow tube 98 so relative rotation between the inner rod 102 and hollow tube 98 adjacent to the bearings 114 is allowed, as opposed to the tube connector 108 which fixedly attaches the inner rod 102 to the hollow tube 98 and effectively prevents relative rotation between the inner rod 102 and hollow tube 98 in the area around the coupling between the inner rod 102 and hollow tube 98 by the tube connector 108. The tube connector 108 can be fixedly attached to the inner rod 102 adjacent to the overlap end 118, which is analogous to the second end 106 of the inner rod 102 in the configuration shown in FIG. 4. As used herein, the tube connector 108 is considered to be rotatably coupling the inner rod 102 to the inner surface 100 of the hollow tube 98 "adjacent" to the overlap end 118 (or second end 106 of the inner rod 102) if the tube connector 108 is fixedly attached to the inner rod 102 with a distance of 15% or less of the overlap length L3 between the tube connector 108 and the overlap end 118 or 15% or less of the rod length L2 between the tube connector 108 and the second end 106 of the inner rod 102. While only one tube connector 108 is shown as rotatably coupling the inner rod 102 to the hollow tube 98, it is contemplated that several tube connectors can rotatably couple the inner rod 102 to the hollow tube 98 adjacent to the overlap end 118 or second end 106 of the inner rod 102.

Figure 5:
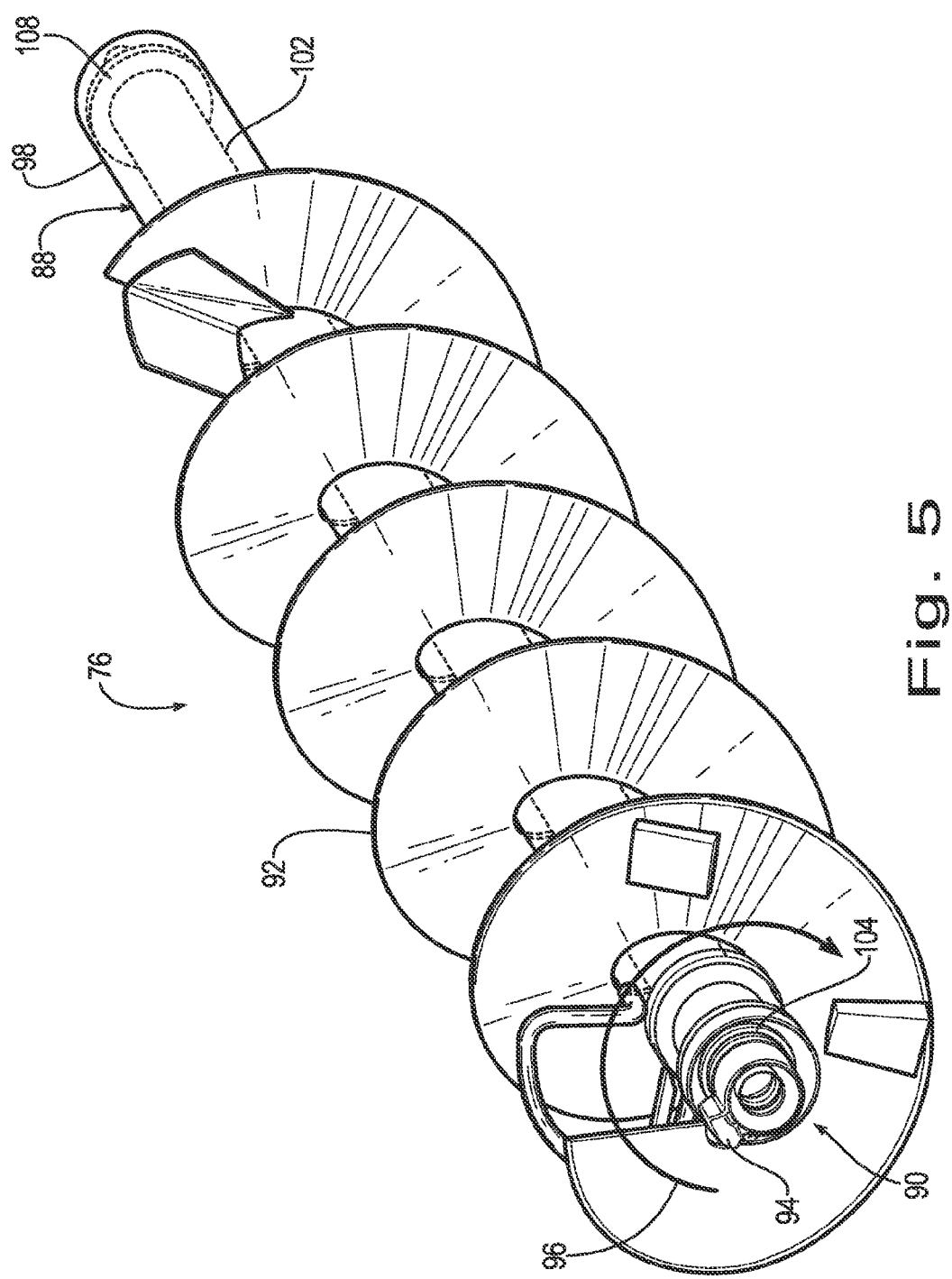
FIG. 5 is a perspective view of an embodiment of a driven auger assembly according to the present invention.

During operation, and referring to FIG. 3 as well as FIG. 5, the driving coupling 82 may have to rotate a near-full rotation prior to abutting the coupler 90 of the driven shaft assembly 88. Once the driving coupling 82 finally does reach the coupler 90, the driving coupling 82 will have a near-full rotation's worth of rotational impact energy that will be transmitted to the coupler 90. This rotational impact energy is transmitted from the coupler 90 to the inner rod 102, due to the fixed attachment of the coupler 90 to the first end 104 of the inner rod 102, and travel along the rod length L2. Since the inner rod 102 is only rotatably coupled to the inner surface 100 of the hollow tube 98 by the tube connector 108, the rotational impact energy travels from the first end 104 of the inner rod 102 toward the tube connector 108, dissipating along the way since the inner rod 102 is free to rotate relative to the hollow tube 98 between its first end 104 and the tube connector 108. This allows for the inner rod 102 to dampen the rotational impact energy before it reaches the tube connector 108, which rotatably couples the inner rod 102 to the hollow tube 98 to drive the hollow tube 98 and rotate the flighting 92 carried by the hollow tube 98. Therefore, the distance between the first end 104 of the inner rod 102 attached to the coupler 90 and the tube connector 108 rotatably coupling the inner rod 102 to the inner surface 100 of the hollow tube 98 can be adjusted to change the distance that the rotational impact energy travels along the inner rod 102, dissipating as it travels, before it is able to be transmitted to the hollow tube 98. By rotatably coupling the inner rod 102 to the hollow tube 98 adjacent to the second end 106 of the inner rod 102 (or overlap end 118), a larger length of the inner rod 102 can be utilized to dissipate the rotational impact energy and lessen, if not eliminate, the amount of rotational impact energy that is transmitted to the hollow tube 98. It should be appreciated that while the driven shaft assembly 88 is shown as being used in a driven auger assembly 76, the driven shaft assembly 88 can be utilized in other applications where it is desired to dampen rotational impact energy between a rotating drive element and a coupled driven element.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis;
    a cleaning system carried by said chassis configured to clean crop material;
    a crop material elevator carried by said chassis and supplied with cleaned crop material from said cleaning system; and
    an unloading auger carried by said chassis and supplied with cleaned crop material that has passed through said crop material elevator, said unloading auger including a drive auger assembly having a drive coupling and a driven auger assembly, said driven auger assembly including:
        a hollow tube having an inner surface;
        an inner rod journaled within said hollow tube and defining a first end and a second end;
        a coupler attached to said first end of said inner rod and configured to couple to said drive coupling; and
        a tube connector rotatably coupling said inner rod to said inner surface of said hollow tube adjacent to said second end of said inner rod such that rotation of said inner rod causes rotation of said hollow tube, wherein said inner rod is only rotatably coupled to said hollow tube adjacent to said second end of said inner rod.

2. The agricultural harvester according to claim 1, wherein said inner rod is substantially solid.

3. The agricultural harvester according to claim 1, wherein said tube connector is a solid disk at least partially surrounding said inner rod.

4. The agricultural harvester according to claim 1, wherein said inner rod has a rod length and said tube has a tube length, said tube length being greater than said rod length.

5. The agricultural harvester according to claim 4, wherein said inner rod has an entirety of said rod length journaled within said hollow tube.

6. The agricultural harvester according to claim 1, further comprising a flighting connected to said hollow tube.

7. A driven shaft assembly for an agricultural harvester, comprising:
    a hollow tube having an inner surface;
    an inner rod journaled within said hollow tube and defining a first end and a second end;
    a coupler attached to said first end of said inner rod and configured to couple said inner rod to a rotating element; and
    a tube connector rotatably coupling said inner rod to said inner surface of said hollow tube adjacent to said second end of said inner rod such that rotation of said inner rod causes rotation of said hollow tube, wherein said inner rod is only rotatably coupled to said hollow tube adjacent to said second end.

8. The driven shaft assembly according to claim 7, wherein said inner rod is substantially solid.

9. The driven shaft assembly according to claim 7, wherein said tube connector is a solid disk at least partially surrounding said inner rod.

10. The driven shaft assembly according to claim 7, wherein said inner rod has a rod length and said tube has a tube length, said tube length being greater than said rod length.

11. The driven shaft assembly according to claim 10, wherein said inner rod has an entirety of said rod length journaled within said hollow tube.

12. The driven shaft assembly according to claim 7, further comprising a flighting connected to said hollow tube.

13. A driven shaft assembly for an agricultural harvester, comprising:
    a hollow tube having an inner surface and defining a tube length;

an inner rod held in said hollow tube and defining a first end, said inner rod and said hollow tube defining an overlap length therebetween with an overlap end that is distanced at least 50% of said tube length away from said first end of said inner rod;

a coupler attached to said first end of said inner rod and configured to couple said inner rod to a rotating element; and a tube connector rotatably coupling said inner rod to said inner surface of said hollow tube adjacent to said overlap end such that rotation of said inner rod causes rotation of said hollow tube, wherein said inner rod is only rotatably coupled to said hollow tube adjacent to said overlap end.

14. The driven shaft assembly according to claim 13, further comprising at least one bearing between said inner rod and said inner surface of said hollow tube.

15. The driven shaft assembly according to claim 13, wherein said overlap end is distanced at least 90% of said tube length away from said first end of said inner rod.

* * * * *